United States Patent
Kinnune et al.

(10) Patent No.: US 9,182,096 B2
(45) Date of Patent: Nov. 10, 2015

(54) LIGHT FIXTURE

(71) Applicant: Cree, Inc., Durham, NC (US)

(72) Inventors: Brian L. Kinnune, Racine, WI (US);
David P. Goelz, Milwaukee, WI (US);
James Michael Lay, Apex, NC (US);
Don Miletich, Franklin, WI (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 13/787,579

(22) Filed: Mar. 6, 2013

(65) Prior Publication Data

US 2014/0252940 A1    Sep. 11, 2014

(51) Int. Cl.

| | |
|---|---|
| *H01J 1/02* | (2006.01) |
| *H01J 7/24* | (2006.01) |
| *H01J 61/52* | (2006.01) |
| *H01K 1/58* | (2006.01) |
| *F21V 3/04* | (2006.01) |
| *F21V 29/70* | (2015.01) |
| *F21V 29/76* | (2015.01) |
| *F21Y 101/02* | (2006.01) |
| *F21Y 105/00* | (2006.01) |
| *F21V 29/506* | (2015.01) |

(52) U.S. Cl.
CPC ............... *F21V 3/0463* (2013.01); *F21V 29/70* (2015.01); *F21V 29/763* (2015.01); *F21V 29/506* (2015.01); *F21Y 2101/02* (2013.01); *F21Y 2105/001* (2013.01)

(58) Field of Classification Search
CPC ..... F21V 3/0463; F21V 29/70; F21V 29/763; F21V 29/506; F21Y 2101/02; F21Y 2105/001
See application file for complete search history.

(56) References Cited

U.S. PATENT DOCUMENTS

| | | | |
|---|---|---|---|
| 5,918,842 A | 7/1999 | Garfinkle | |
| 6,158,882 A | 12/2000 | Bischoff, Jr. | |
| 6,679,461 B1 | 1/2004 | Hawkins | |
| 6,776,504 B2 | 8/2004 | Sloan et al. | |

(Continued)

FOREIGN PATENT DOCUMENTS

| | | | | |
|---|---|---|---|---|
| WO | 0216826 A1 | 2/2002 | | |
| WO | WO2013078180 | * | 5/2013 | ................ F21S 2/00 |

OTHER PUBLICATIONS

Cree, Inc. "Optimizing PCB Thermal Performance." Excerpts from product brochure. 2 pages. Date: Copyright 2010-2012.

(Continued)

*Primary Examiner* — Donald Raleigh
(74) *Attorney, Agent, or Firm* — Jansson Munger McKinley & Shape Ltd.

(57) ABSTRACT

An LED light fixture includes a heat-sink body having a circuit-board mounting surface and a circuit board in thermal-contact relationship to the circuit-board mounting surface. The circuit board has an LED-populated area and a surrounding non-LED-populated area such that lateral heat conduction within the circuit board is greater than heat conduction from the circuit board to the circuit-board mounting surface. The fixture may be a low-profile LED light fixture including a base plate which has a substantially planar back surface, a front surface and heat-dissipating surfaces extending forward from the front surface. An LED circuit board and at least one LED power-circuitry unit, which are secured with respect to the front surface adjacent to the heat-dissipating surfaces, do not extend behind the back surface of the base plate.

43 Claims, 16 Drawing Sheets

(56) References Cited

U.S. PATENT DOCUMENTS

| | | | |
|---|---|---|---|
| 6,882,111 B2 | 4/2005 | Kan et al. | |
| 7,163,328 B2 | 1/2007 | Chang et al. | |
| 7,513,659 B2 | 4/2009 | Vukosic et al. | |
| 7,559,672 B1 | 7/2009 | Parkyn et al. | |
| 7,798,670 B2 | 9/2010 | Kinnune | |
| 7,878,232 B2* | 2/2011 | Arik et al. | 165/80.2 |
| 8,322,881 B1* | 12/2012 | Wassel | 362/247 |
| 2002/0176251 A1* | 11/2002 | Plank et al. | 362/241 |
| 2009/0290348 A1* | 11/2009 | Van Laanen et al. | 362/249.02 |
| 2009/0296403 A1 | 12/2009 | Zhang et al. | |
| 2010/0195326 A1* | 8/2010 | Boxler et al. | 362/235 |
| 2012/0087118 A1 | 4/2012 | Bailey et al. | |
| 2012/0162990 A1* | 6/2012 | Crandell et al. | 362/249.04 |
| 2012/0262921 A1* | 10/2012 | Boomgaarden et al. | 362/249.02 |
| 2013/0279179 A1* | 10/2013 | Pearson et al. | 362/364 |
| 2014/0321126 A1* | 10/2014 | Narag et al. | 362/306 |

OTHER PUBLICATIONS

Best Technology. Metal Core Printed Circuit Board. www.bestpcbs.com. 1 page.

Security Lighting Systems. UCL LED Recessed Petroleum Canopy Luminaire brochure. 4 pages.

\* cited by examiner

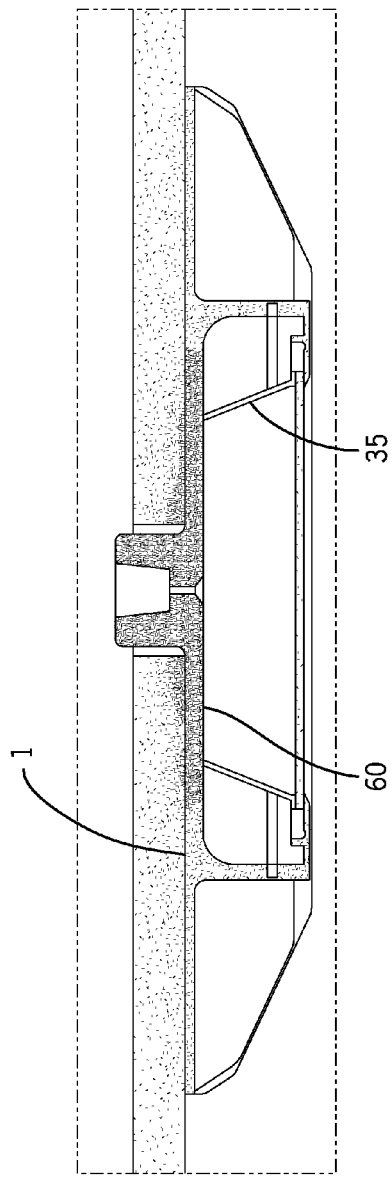
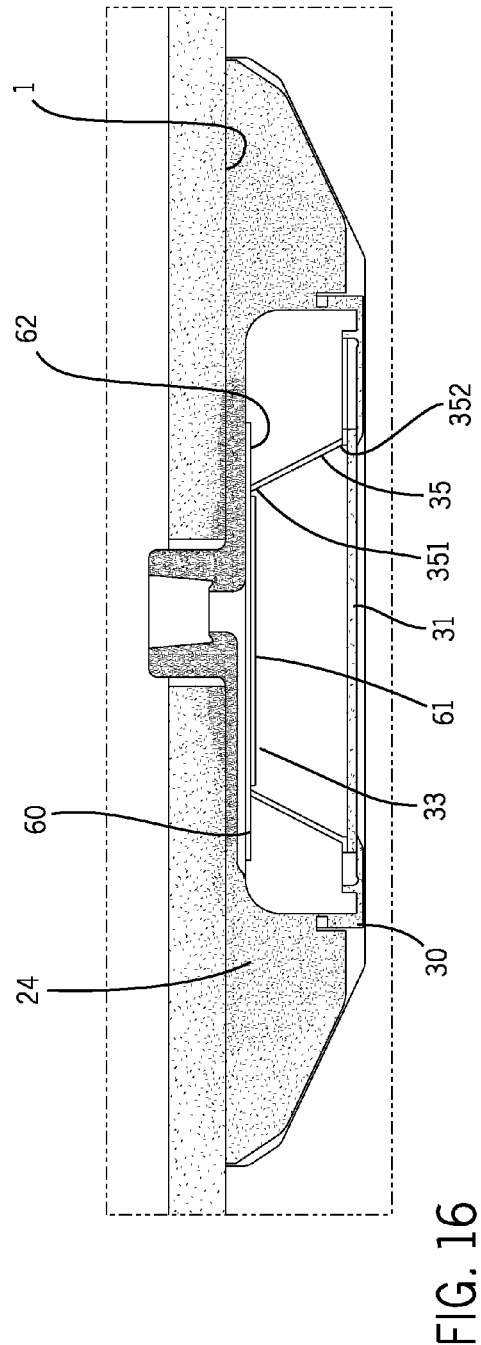
FIG. 15
FIG. 16

LIGHT FIXTURE

FIELD OF THE INVENTION

This invention relates to light fixtures and, more particularly, to LED light fixtures.

BACKGROUND OF THE INVENTION

In recent years, the use of light-emitting diodes (LEDs) in development of light fixtures for various common lighting purposes has increased, and this trend has accelerated as advances have been made in the field. Indeed, lighting applications which previously had typically been served by fixtures using what are known as high-intensity discharge (HID) lamps are now being served by LED light fixtures. Such lighting applications include, among a good many others, so-called canopy lights for gasoline stations and the like, soffit-mounted light fixtures, surface-mounted light fixtures, and a variety of factory lighting and commercial building lighting.

LED light fixtures present particularly challenging problems which relate to size and configuration, ease of installation, servicing and configurational efficiency. Achieving improvements in such charachteristics while also delivering excellent heat dissipation from light fixture components can be problematic. It is desired to achieve compactness in LED light fixtures, ease of installation and ease of servicing while still allowing excellent light output and operational efficiency.

Always a major consideration in the development of LED light fixtures for various high-volume applications is controlling product cost even while delivering improved light-fixture performance. Finding ways to significantly improve LED light-fixture characteristics, use and performance without increase in cost of manufacturing would be much desired.

SUMMARY OF THE INVENTION

The present invention relates to improved LED light fixtures.

In one aspect of this invention, the inventive LED light fixture includes: a heat-sink body having a circuit-board mounting surface; an LED circuit board affixed in thermal-contact relationship to the circuit-board mounting surface and having an LED-populated area surrounded by a non-LED-populated area; an aperture member over the circuit board and defining an optical aperture, the circuit board and optical aperture being configured such that the non-LED-populated area extends beyond the optical aperture.

In understanding aspects of the invention, it is helpful here to state the meaning of certain key terms:

The term "non-linear array" as used herein with respect to LED light sources means a planar array of LED light sources which do not all lie along the same straight line. In other words, the array is at least two-dimensional, not linear. Furthermore, the two-dimensional array, which may be square or otherwise, includes a multiplicity of LED light sources, and can include as many as 70-240 or more LED light sources. Each LED light source may be an LED package which includes a single LED (or a closely-spaced group of LEDs) mounted either directly on the circuit board or on a submount on the circuit board, with what is commonly referred to as a primary lens over such LED(s).

The term "closed boundary" as used herein with respect to an array of LED light sources refers to the perimeter-line that has straight segments and circumscribes the array.

As used herein, the term "LED-populated area" means the circuit-board region within the closed boundary minimally circumscribing the LED light sources, provided that the circuit board has a non-linear array of LED light sources thereon with the spacing between adjacent LED light sources being no more than about three times the cross-dimension of each of the LED light sources. The term "non-LED-populated area" means the circuit-board region outside the LED-populated area. In some embodiments, the non-LED populated area can include other circuit elements, but in other embodiments it does not include any circuitry.

The term "optical aperture" as used herein means the light-fixture opening of smallest cross-sectional area through which aperture the light from the LED-populated area passes.

The term "substantially isothermal" as used herein in reference to the circuit board means that temperature variation across the circuit board is no more than 5° C.

In certain embodiments, at least 50% of the non-LED-populated area extends beyond the optical aperture; and in some substantially the entirety of the non-LED-populated area extends beyond the optical aperture. In certain embodiments, at least 50% of the area of the circuit board extends beyond the optical aperture. The non-LED-populated area of the circuit board may extend beyond the optical aperture by, e.g., more than 0.5 inches on every side of the circuit board, or in some cases by at least about 1.0 inch on every side therearound. In some of such embodiments, the non-LED-populated area of the circuit board is greater than the LED-populated area.

In certain embodiments, during operation, the circuit board is substantially isothermal; its non-LED-populated area extending beyond the optical aperture is very close in temperature to the temperature of its LED-populated area, and this facilitates heat dissipation. That is, the circuit board, which comprises a good thermally-conductive material, such as copper or aluminum, spreads the heat laterally away from the LED-populated area and allows rapid heat transfer to the heat-sink body from across the entire circuit board—even in such "hidden" positions as are beyond the boundary of the optical aperture. In some embodiments, the circuit board can be proximate heat-dissipating surfaces of the heat sink to provide a better thermal path to the heat dissipating surfaces of the heat sink. The invention takes advantage of the anisotropic nature of heat conduction—the fact that heat conduction laterally within the circuit board is greater than heat conduction from the circuit board to the heat-sink body. As such, the heat will tend to spread laterally away from the LED-populated area thus facilitating removal of heat from the LED-populated area to the non-LED-populated area and to the heat sink, which increases the optical efficiency of the LEDs. The spacing between adjacent LED light sources of the LED-populated area may be no more than about the cross-dimension of each of the LED light sources.

In some embodiments, the heat-sink body forms a base of the fixture. Some of such embodiments include a cover secured with respect to the base, the cover defining a light-transmissive opening over the LED-populated area.

In certain embodiments, the opening in the cover defines the optical aperture. In other embodiments, a reflector or other optical element or lens defines the optical aperture. Depending on the embodiment, the optical elements defining the optical aperture can be integral with or mounted to the cover and/or LED assembly. In certain embodiments, the aperture member is a reflector which extends from a first end adjacent to and surrounding the LED-populated area to a second end which is substantially aligned with the cover opening. The reflector enhances light output. In some of such embodiments, the LED-populated area is substantially rectangular in shape and the reflector is frusto-pyramidal in shape. Other embodiments are possible where the LED populated area is circular or rectangular and includes an open space for mounting or electrical connections. In other embodiments, the cover serves as the aperture member and the light-transmissive opening is the optical aperture.

In certain embodiments, a light-transmissive member is positioned in the cover opening. The light-transmissive member may include a phosphorescent material such that at least some of the light emitted by the fixture has a different wavelength than light as first emitted from the LED-populated area. For example the LEDs can be blue LEDs where the blue light excites the phosphorescent material, such as yttrium aluminum garnwt or YAG, to produce a secondary emission of light where the blue light and the secondary emission produce white light. In other embodiments, different color LEDs can be used together with individual white LEDs (blue LEDs plus phosphor) or with blue LEDs in a remote phosphor configuration where the light-transmissive element is coated and/or impregnated with the phosphorescent material.

Another aspect of this invention relates to the low-profile characteristic of the LED light fixture. The low-profile LED light fixture includes a base plate, an LED circuit board secured to a front surface of the base plate and at least one LED power-circuitry unit secured with respect to the front surface of the base plate in a position adjacent to the circuit board. Heat-dissipating surfaces extend from the front surface of the base plate, the LED circuit board being in position adjacent to the heat-dissipating surfaces. The base plate has a substantially planar back surface from which no portion of the light fixture extends other than parts necessary for electrical connection, e.g., for surface mounting on a gasoline-station canopy.

In certain embodiments, the heat-dissipating surfaces extend substantially orthogonally from the front surface of the base plate, and in certain embodiments a cover is movably secured with respect to the base plate. Such cover may extend over the LED power-circuitry unit(s) while leaving uncovered the heat-dissipating surfaces and defining the aforementioned light-emitting opening over the LED circuit board.

The base plate may be rectangular with the heat-dissipating surfaces being in two regions positioned beside the LED circuit board only on two opposite lateral sides thereof. In some of such embodiments, the two regions of the heat-dissipating surfaces are on two of the four lateral sides of the base plate.

In some embodiments, the base plate defines a pair of cavities along the front surface thereof, one on either side of the LED circuit board in positions along the other two opposite lateral sides of the base plate. Depending on the embodiment, the LED power-circuitry unit may be positioned within one of the two cavities. Light-fixture control circuitry, sensor and/or communication circuitry may be positioned within the other of the two cavities. Depending on the embodiment, a cover can extend over one or both cavities. In some of such embodiments, the light-emitting opening in the cover is bounded by portions of the cover over the LED power-circuitry and the control circuitry.

The cross-section of the fixture in a plane orthogonal to the base plate and located between the back surface of the base plate and a forwardmost surface of the cover is such that the aspect ratio of such cross-section is greater than about 6. The aspect ratio may be greater than about 7.5. In some embodiments, the thickness of the cross-section is no more than about 3 inches, and may be no more than about 2 inches for a fixture of very low profile.

As already noted, the LED light fixture may include a lens attached to the cover over the light-emitting opening. The light-emitting opening in the cover defines a plane and, in certain of such embodiments, the lens is substantially planar and is in the plane defined by the opening. In certain other embodiments, the lens is a drop-out lens which extends beyond the plane of the opening; this allows a portion of the light to be directed laterally.

In certain embodiments, the LED power-circuitry unit is in thermal communication with the cover, such that during operation primary heat transfer from the power-circuitry unit (s) is to the cover and primary heat transfer from the LED circuit board is to the base plate. The power-circuitry unit may be directionally biased toward the cover to facilitate thermal contact between the power-circuitry unit and the cover.

The low-profile LED light fixture of this invention may be a surface-mount fixture for mounting on a surface of a structure such that, when the fixture is installed, the back surface of the base plate is substantially against the structure surface—with no portion of the light fixture other than parts necessary for electrical connection being behind the structure surface. This allows mounting to gasoline-station canopies and the like with a minimal-size opening in the canopy. Such surface mounting also facilitates any needed servicing of such canopy light fixture.

As used herein in referring to portions of the devices of this invention, the terms "upward," "upwardly," "upper," "downward," "downwardly," "lower," "upper," "top," "bottom" and other like terms assume that the light fixture is in its usual position of use and do not limit the invention to any particular orientation.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

FIG. 15 is a partially-schematic cross-sectional view of one embodiments of the LED light fixture of FIG. 1.

FIG. 16 is a partially-schematic cross-sectional view of another embodiments of another embodiment of an LED light fixture according to this invention.

DETAILED DESCRIPTION OF EXEMPLARY EMBODIMENTS

Figure 1:
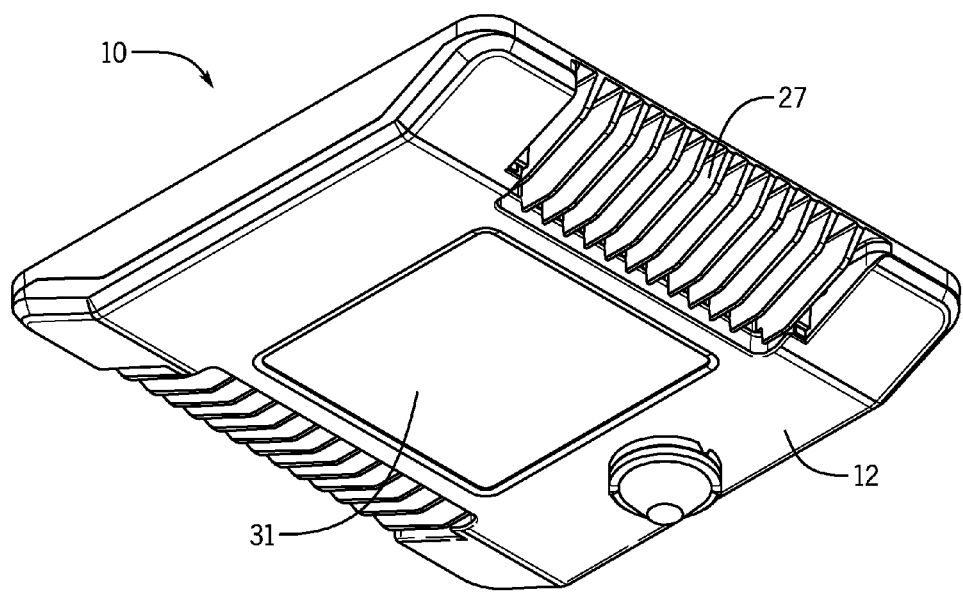
FIG. 1 is a perspective view of one embodiment of an LED light fixture in accordance with the present invention.

FIGS. 1-25 illustrate exemplary embodiments of LED light fixtures in accordance with this invention. Common or similar parts in different embodiments are given the same numbers in the drawings; the light fixtures themselves are often referred to by the numeral 10.

Figure 2:
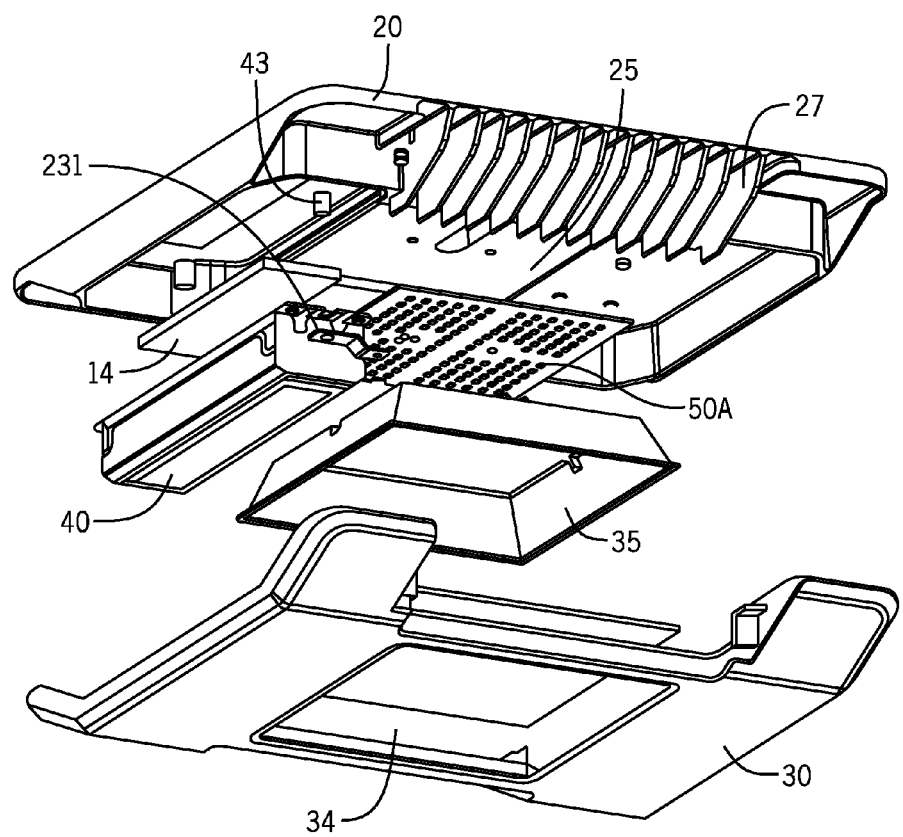
FIG. 2 is an exploded perspective view of the LED light fixture seen in FIG. 1.
Figure 5:
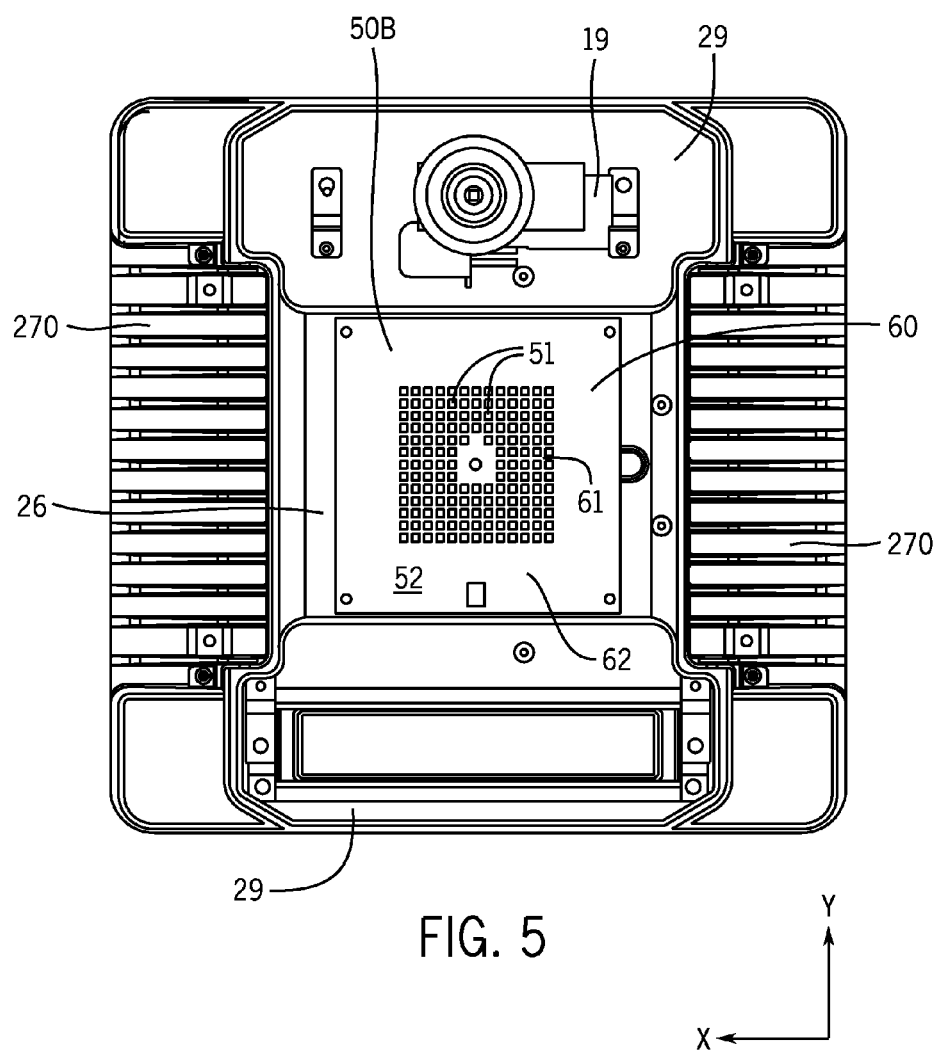
FIG. 5 is a plan view of a somewhat different embodiment of the LED light fixture according to the present invention.
Figure 6:
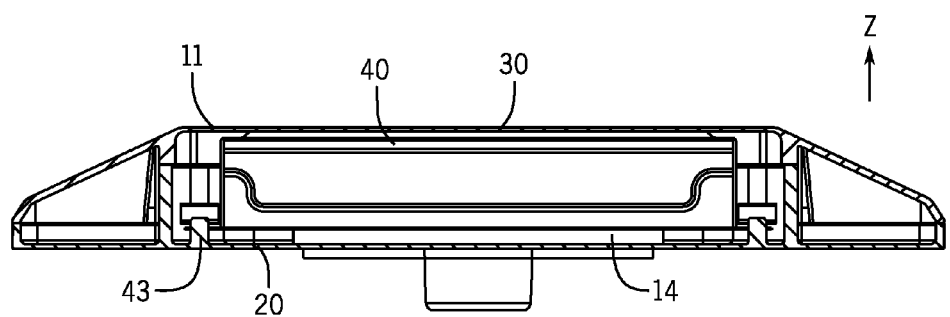
FIG. 6 is a cross-sectional view of the LED light fixture of FIG. 5 taken along section 6-6 as indicated in FIG. 5.

As seen in FIGS. 1, 2 and 6, light fixture 10 includes a housing 12 defining an enclosure 11 formed by a base 20 and a cover 30 movably secured with respect to base 20. FIGS. 3-7 show a power-circuitry unit 40 secured with respect to base 20 such that, when the cover 30 is closed, power-circuitry unit 40 is in thermal communication with cover 30.

Figure 3:
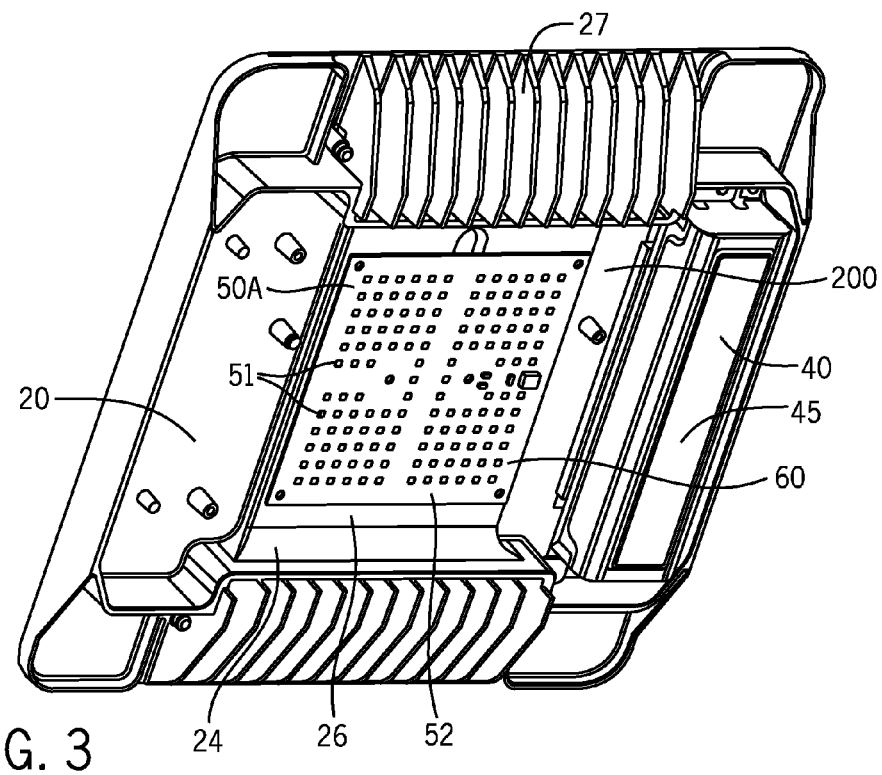
FIG. 3 is a perspective view of the LED light fixture of FIG. 1 with its cover removed.

As best illustrated in FIGS. 2, 3 and 5, a light emitter is secured with respect to housing 12 within enclosure 11. FIGS. 3 and 5 show two alternative light emitters 50A and 50B, each of which includes LED sources 51 on an LED-circuit board 52 which is secured with respect to base 20. As seen in FIGS. 3, 5 and 15-17, which illustrate alternative embodiments, the light emitter is in thermal communication with base 20. Base 20, as seen in FIGS. 2 and 3, is a single-piece metal casting. Cover 30, as seen in FIGS. 2 and 3, is a metal casting supporting a light-transmitting lens member 31 over the light emitter.

Such arrangements, in which the light sources are in thermal communication with base 20 while power-circuitry unit 40 is in thermal communication with cover 30, is very advantageous. In other words, during operation of the light fixtures this arrangement provides primary heat transfer from the power-circuitry unit and primary heat transfer from the LED emitter(s) to separate major enclosure members, each of which serve as a heat sink.

FIG. 2 shows cover 30 fully removable for complete access to within enclosure 11.

As seen in FIG. 2, housing 12 has first and second housing members, base 20 being the first housing member and cover 30 being the second housing member and being movably secured with respect to base 20 between use and non-use positions. FIGS. 3-7 show power-circuitry unit 40 secured with respect to base 20. In some embodiments, which are not illustrated, the power-circuitry unit may be secured to the cover.

As seen in FIGS. 6, 7 and 10-14, power-circuitry unit 40 is constrained such that when cover 30 is in its use position, power-circuitry unit 40 is in thermal communication with cover 30. Power-circuitry unit 40 may be in fully-fixed position for such primary thermal communication with cover 30, or it may be urged against cover 30 when cover 30 is in its use position.

Figure 7:
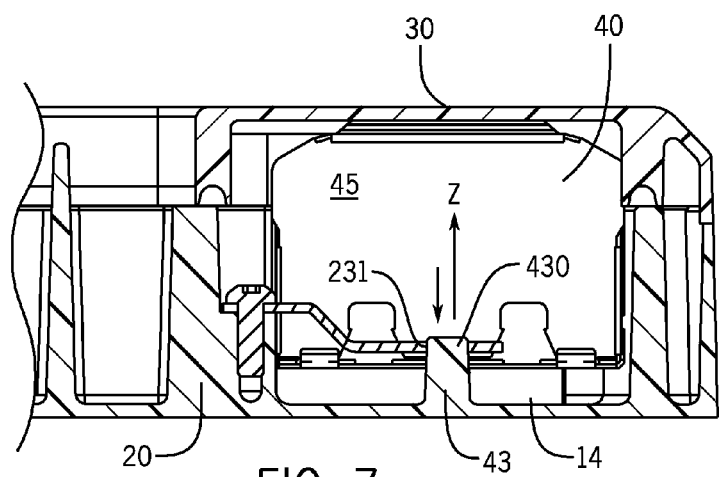
FIG. 7 is a fragmentary cross-sectional view of such LED light fixture taken along section 7-7 as indicated in FIG. 5.

FIGS. 6 and 7 illustrate power-circuitry unit 40 in fixed orientation with respect to base 20 along a plane which includes X and Y isometric axes of base 20. These figures also show that power-circuitry unit 40 is movable along axis Z which is orthogonal to axes X and Y. In other words, power-circuitry unit 40, as seen in FIGS. 3-7 and 13, has only one degree-of-freedom of movement with respect to base 20, and that is a linear freedom of movement.

Figure 14:
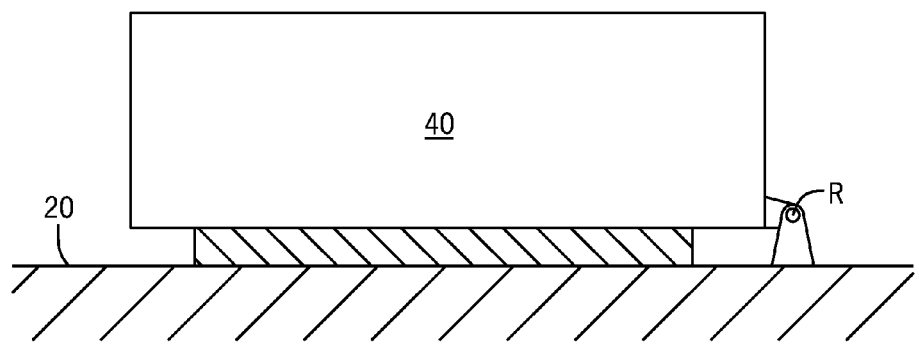

FIG. 14 schematically illustrates an alternative embodiment in which the degree-of-freedom of movement is rotational about an axis R that is fixed with respect to base 20. In each situation, power-circuitry unit 40 is directionally biased toward cover 30 to facilitate thermal contact between power-circuitry unit 40 and cover 30.

As seen in FIGS. 2, 6 and 7, fixture 10 includes a resilient member in the form of a compressible pad 14 situated between power-circuitry unit 40 and base 20. As best seen in FIGS. 6 and 7, compressible pad 14 is configured and positioned such that, when cover 30 is closed, pad 14 pushes power-circuitry unit 40 against cover 30. As seen in FIG. 2, pad 14 is sized to approximate the footprint of power-circuitry unit 40 on base 20, thereby to facilitate thermal isolation between power-circuitry unit 40 and base 20, and thus facilitate primary heat transfer from power-circuitry unit 40 to cover 30.

Figure 11:
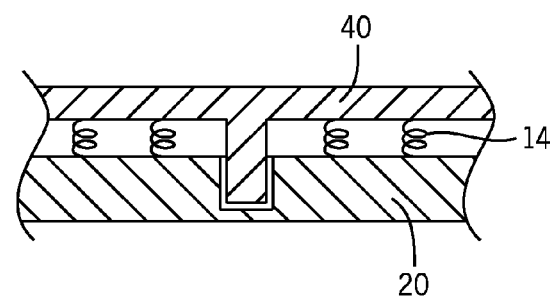

In FIG. 11, a resilient member is shown in the form of springs 15 such as coil springs positioned between power-circuitry unit 40 and base 20 and serving to bias power-circuitry unit away from base 20 along axis Z into firm contact with cover 30 in its use position.

Figure 4:
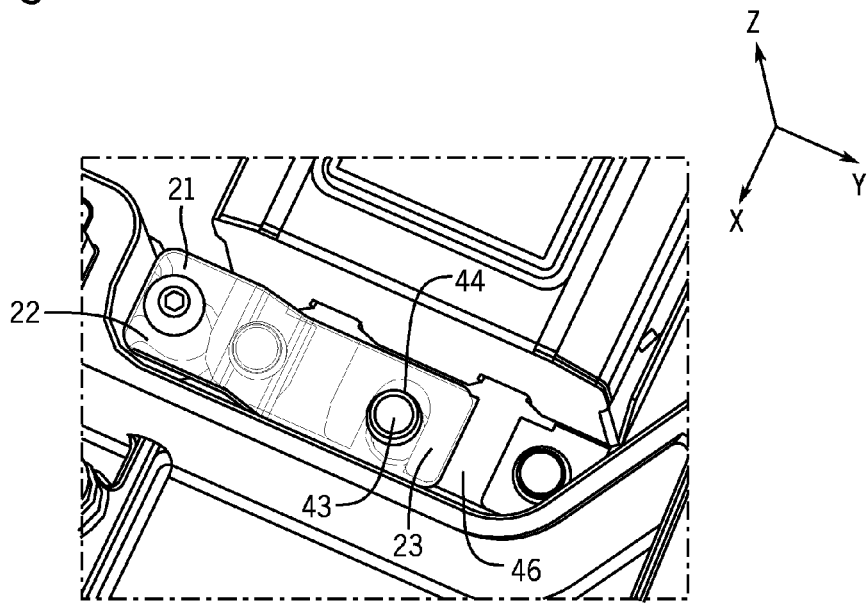
FIG. 4 is a fragmentary perspective view showing securement of the LED power-circuitry unit with respect to the base of the LED light fixture of FIG. 1.

As seen in FIGS. 4, 6 and 7, light fixture 10 includes a first locator in the form of a post 43 and a second locator in the form of a hollow 44 defined by power-circuitry unit 40, such inter-engaged first and second locators serving to constrain power-circuitry unit 40 along the aforementioned X and Y axes. As best seen in FIGS. 6 and 7, post 43 extends onto the hollow 44 such that power-circuitry unit 40 is slidable on post 43 along axis Z to facilitate thermal contact between power-circuitry unit 40 and cover 30. FIG. 5 shows two posts 43 and corresponding hollows 44, the post/hollow pairs being spaced from one another along the facing surfaces of base 20 and power-circuitry unit 40.

Figure 10:
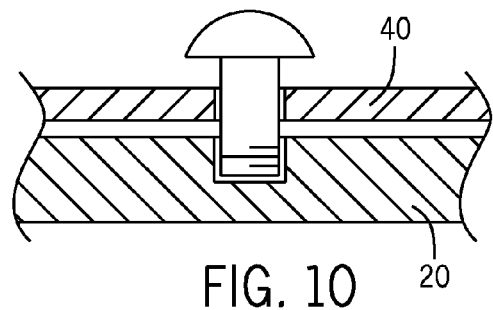
FIGS. 10-12 are schematic illustrations of alternative embodiments for positioning the LED power-circuitry unit with respect to the base.
Figure 12:
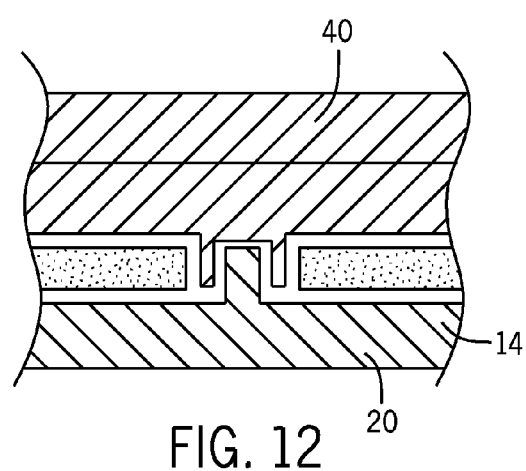
Figure 13:
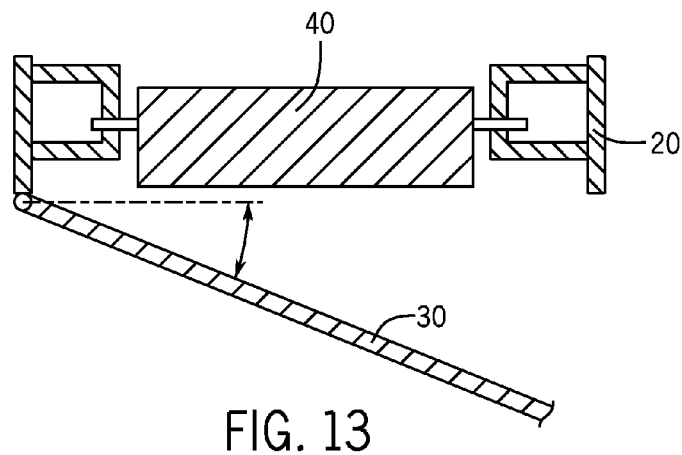
FIGS. 13 and 14 are schematic illustrations of alternative embodiments for allowed movement of the LED power-circuitry unit with respect to the base.

FIGS. 10-13 illustrate alternative embodiments of the first and second locators which allow back-and-forth movement of the power-circuitry unit along a direction substantially orthogonal to the aforementioned X-Y plane. In FIG. 10, the power-circuitry unit and the base define aligned hollows with a fastener such as a self-tapping screw being inserted through both hollows to secure the power-circuitry unit along the base while allowing back-and-forth movement of the power-circuitry unit orthogonally thereto. FIG. 11 shows the power-circuitry unit having a post which extends into a hollow defined in the base, with springs 15 being positioned between the base and the power-circuitry unit. In FIG. 12, the power-circuitry unit is shown to include a protruding female portion defining a cavity which receives a post extending from the base. FIG. 13 schematically illustrates an embodiment in which the power-circuitry unit is secured at a fixed distance from the base and is slidable along the base.

In FIGS. 1-7, power-circuitry unit 40 is shown to include a heat-conductive casing 45 which is in thermal contact with cover 45. As best seen in FIGS. 4-6, casing 45 has a flange portion 46 which defines hollow 44. FIGS. 6 and 7 show casing 45 being directionally biased toward cover 30 to facilitate thermal contact between casing 45 and cover 30.

Figure 8:
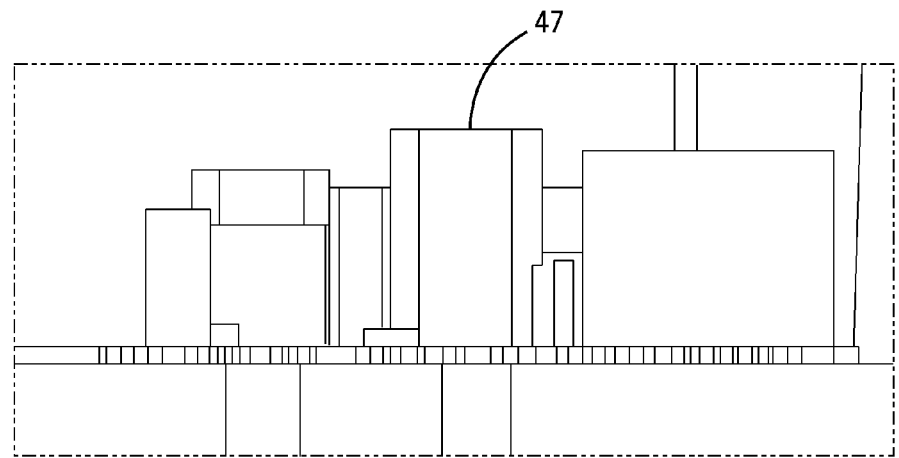
FIGS. 8 and 9 are a side elevation and a perspective view of an example of a caseless LED power-circuitry unit.
Figure 9:
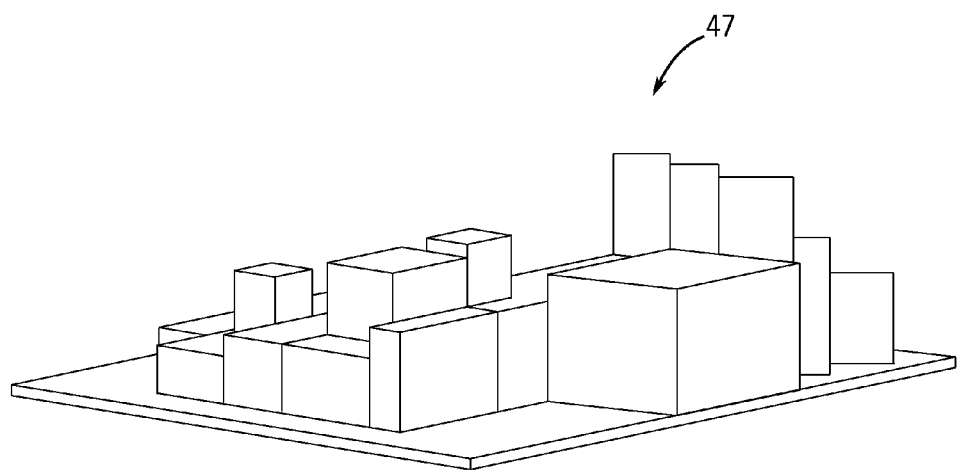

FIGS. 8 and 9 illustrate the power-circuitry unit as a caseless LED driver 47. Such caseless LED driver 47 can be removably secured with respect to base 20. The power-circuitry components of caseless LED driver 47 are encapsulated (potted) in a protective polymeric material on a driver board prior to installation in the fixture such that driver 47 is readily replaceable and does not have any potting applied during or after installation in the fixture. Suitable examples of such protective polymeric encapsulating material include thermoplastic materials such as low-pressure injection-molded nylon, which amply protect caseless driver 47 from electrostatic discharge while conducting heat to facilitate cooling of the driver during operation.

As seen in FIGS. 2-5, light fixture 10 includes brackets 21 secured with respect to base 20 and holding power-circuitry unit 40 with respect to base 20 when enclosure 11 is open. As shown in FIGS. 4 and 7, each bracket 21 has an affixed end 22 secured with respect to base 20 and a free end 23 positioned to engage flange portion 46 of casing 45 of power-circuitry unit 40. FIG. 4 shows free end 23 defining an aperture 231 which receives distal post-end 430 with flange portion 46 of casing 45 being between base 20 and free end 23 of bracket 21.

FIGS. 2, 3, 5, 15-17 and 26 illustrate a heat-sink body 24 forming base 20 and having a circuit-board mounting surface 25. As seen in FIGS. 1, 2, 15-17 and 26, an aperture member is supported over circuit-board mounting surface 25. An LED circuit board 60 is affixed in thermal-contact relationship to circuit-board mounting surface 25. The LED circuit board, as later described herein, may be a metal-core board or other type of circuit board providing heat dissipation from LED emitters during operations.

As best seen in FIG. 5, circuit board 60 has an LED-populated area 61 with LED sources 51 concentrated in the middle region of the circuit board which has a non-LED-populated area 62 surrounding LED-populated area 61. FIG. 5 also shows that non-LED-populated area 62 is greater than LED-populated area 61.

Figure 17:
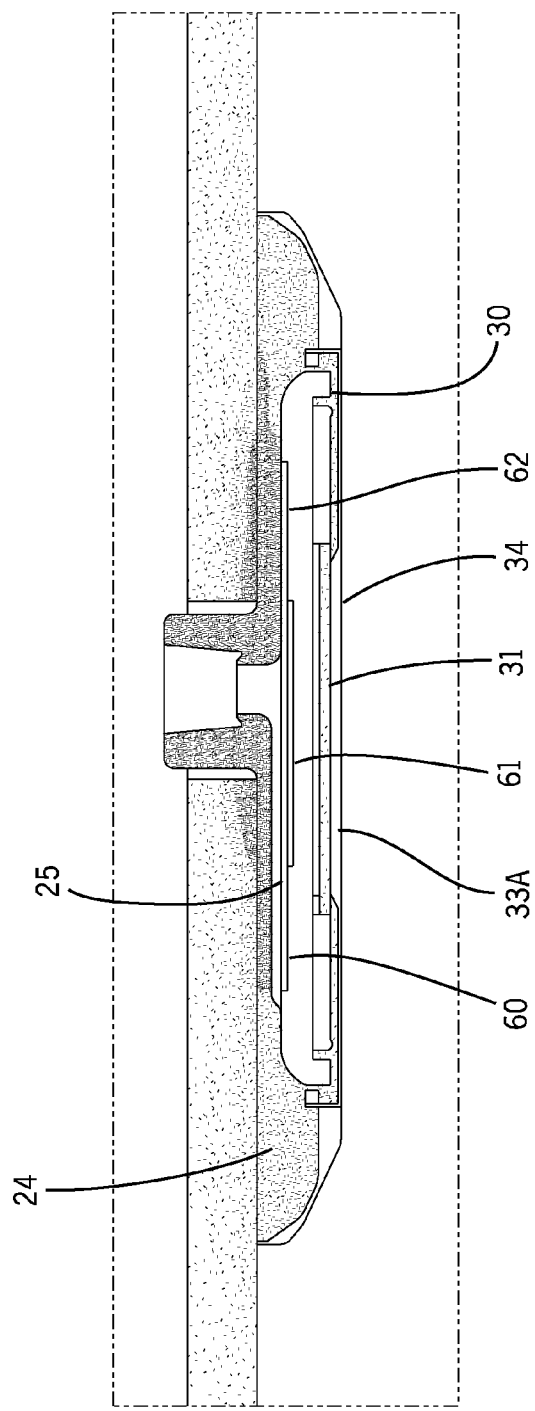
FIG. 17 is a partially-schematic cross-sectional view of still another embodiments of an LED light fixture according to this invention.

The large non-LED-populated area surrounding the LED-populated area provides valuable advantages of anisotropic heat conduction during operation. In particular, heat generated by the LED light sources on the LED-populated area preferentially spreads in lateral directions across the entire circuit board more than in directions orthogonal to the circuit board into the heat-sink body. That is, the circuit board, which comprises a good thermally-conductive material, such as copper or aluminum, spreads the heat laterally away from the LED-populated area and allows rapid heat transfer to the heat-sink body from across the entire circuit board—even in such "hidden" positions as are beyond the boundary of the optical aperture. FIGS. 15-17 show circuit board 60 in thermal contact with circuit-board mounting surface 25 of heat-sink body 24 such that heat from the entire area of the circuit board is conducted to heat sink body 24 for heat dissipation. FIGS. 15-17 schematically illustrate that heat conduction laterally within circuit board 60 is greater than heat conduction from circuit board 60 to heat-sink body 24. This preferential spreading of heat to non-LED-populated area 62 facilitates removal of heat from circuit board 60 and thus facilitates heat removal from LED-populated area 61 which increases the optical efficiency of the LEDs. The circuit board can be proximate heat-dissipating surfaces of the heat sink to provide a better thermal path to the heat dissipating surfaces of the heat sink. As also schematically shown in FIGS. 15-17, the entire area of the circuit board, including the LED-populated and non-LED-populated areas, approaches being isothermal, i.e., with temperatures during operation being substantially isothermal thereacross. As such, the heat will tend to spread laterally away from the LED-populated area thus facilitating removal of heat from the LED-populated area to the non-LED-populated area and to the heat sink, which increases the optical efficiency of the LEDs.

FIG. 5 shows the spacing between adjacent LED light sources 51 of LED-populated area 61 being no more than about the cross-dimension of each of LED light sources 51. Particularly tight spacing of the LED light sources of on the LED-populated area tend to improve the substantially isothermal characteristic of the circuit board.

As seen in FIGS. 15-17, LED circuit board 60 is in position between mounting surface 25 and the aperture member. The aperture member is shown to form a single optical aperture 33. Aspects of this invention are based on the recognition that the optical aperture need not be coextensive with the circuit board, but instead may be substantially coextensive with the LED-populated area—or at least be of a size such that it leaves much or substantially all of the non-LED-populated area beyond the boundary of the optical aperture. This is illustrated in FIGS. 16 and 17. FIG. 16 schematically illustrates at least the majority of non-LED-populated area 62 extending beyond optical aperture 33. This is also true for the embodiment of FIG. 17. In both cases, optical aperture 33 exposes all of LED-populated area 61. Indeed, FIGS. 16 and 17 illustrate at least 50% of the area of circuit board 60 extending beyond optical aperture 33.

The present invention provides efficient ways for addressing thermal challenges and extracting increased amounts of light from the LEDs of LED light fixtures. One such way, as described above, is increasing the surface area of the printed circuit board without changing the configuration of the LED array thereon. This takes advantage of the extra circuit-board material for heat-transfer purposes.

Given the thermal purposes of this invention, the material used for the LED circuit board should be selected with particular regard to its thermal conductivity. Using a metal-core printed circuit board is particularly advantageous. A simple metal-core circuit board is comprised of a solder mask, a copper circuit layer, a thermally-conducting thin dielectric layer, and a much thicker metal-core base layer. Such layers are laminated and bonded together, providing a path for heat dissipation from the LEDs. The base layer is by far the thickest layer of the circuit board and may be aluminum, or in some cases copper, a copper alloy or another highly thermally-conductive alloy. Such highly-conductive base layer facilitates lateral conduction of heat in the board from beneath the LED-populated area to and across the non-LED-populated area. And since board temperatures remain high even across the non-LED-populated area, the total area of substantial thermal transfer from the circuit board to the heat sink is beneficially large—substantially larger than just the LED-populated area.

For example, if instead of sizing the circuit board to closely match the size of the LED array, the circuit board is enlarged to have a non-LED-populated area around an LED-populated area with such the non-LED-populated area extending beyond the optical aperture. In one example, such circuit-board enlargement decreases the temperature of the LEDs by 2° C. without adding manufacturing costs, and this allows an increase on total lumen output. Larger decrease in temperature and larger increase in total lumen output are possible depending on non-LED-populated area of such circuit board.

The present invention provides a further way for addressing thermal challenges in LED light fixtures. In particular, the thermal load of the driver (power-circuitry unit) is substantially removed from the fixture member (e.g., the base member) which is in primary thermal communication with the LED circuit board, and instead is transferred to a separate fixture member such as the light-fixture cover. In one example, such thermal "repositioning" of the driver provides a decrease in the LED temperature of about 2° C., and the thermal separation of the driver from the LED circuit board also lowers the driver temp by 2° C. This permits drive current to be increased while still maintaining a 100,000 hour driver life rating and allowing an increase on total lumen output.

In some examples of light fixtures of this invention, enlargement of the non-LED-populated area is combined with separation of the primary thermal paths of the LEDs and the LED driver. In one example, this combination of thermal advantages decreases the LED temperature by 4° C. and allows a 15% increase in the drive current which resulted in 13% increase in total lumen output.

In FIGS. 15 and 16, the aperture member is a reflector 35 which extends from a first end 351 adjacent to and surrounding LED-populated area 61 to a second end 352 substantially aligned with cover opening 34. FIG. 2 best shows LED-populated area 61 being substantially rectangular in shape and reflector 35 being frusto-pyramidal in shape. FIG. 17 shows cover 30 itself serving as the aperture member; cover opening 34 forms optical aperture 33A. In some embodiments, the opening in the cover defines the optical aperture. In other embodiments, a reflector or other optical element or lens defines the optical aperture. Depending on the embodiment, the optical elements defining the optical aperture can be integral with or mounted to the cover and/or LED assembly.

As also seen in FIGS. 1 and 15-17, a light-transmissive member 31 is positioned in cover opening 34. Light-transmissive member 31 may include a phosphorescent material such that at least some of the light emitted by the fixture has a different wavelength than light emitted from the LED-populated area. For example, the LED-populated area may include LED sources of the type emitting light with wavelength of a blue color, and in order to achieve a customary white-color light, a so-called "remote phosphor" technique is used. The remote-phosphor technique typically utilizes blue LED(s)—generally considered to be the color that delivers maximum efficacy. The phosphor that generates the white light is included on a lens or diffuser such as light-transmissive member 31 by coating or otherwise. Such "remote phosphor" technique delivers better efficacy than do phosphor-converted LEDs, since the phosphors are more efficient in conversion when operating at the lower phosphor temperatures made possible by such remote configurations. For example the LEDs can be blue LEDs where the blue light excites the phosphorescent material, such as yttrium aluminum garnwt or YAG, to produce a secondary emission of light where the blue light and the secondary emission produce white light. In other embodiments, different color LEDs can be used together with individual white LEDs (blue LEDs plus phosphor) or with blue LEDs in a remote phosphor configuration where the light-transmissive element is coated and/or impregnated with the phosphorescent material.

FIGS. 1, 6, 15-21, 24 and 25 illustrate another aspect of this invention, namely, LED light fixture 10 as a low-profile LED light fixture with particular advantages, including, e.g., its serving as a surface-mount canopy light.

Figure 23:
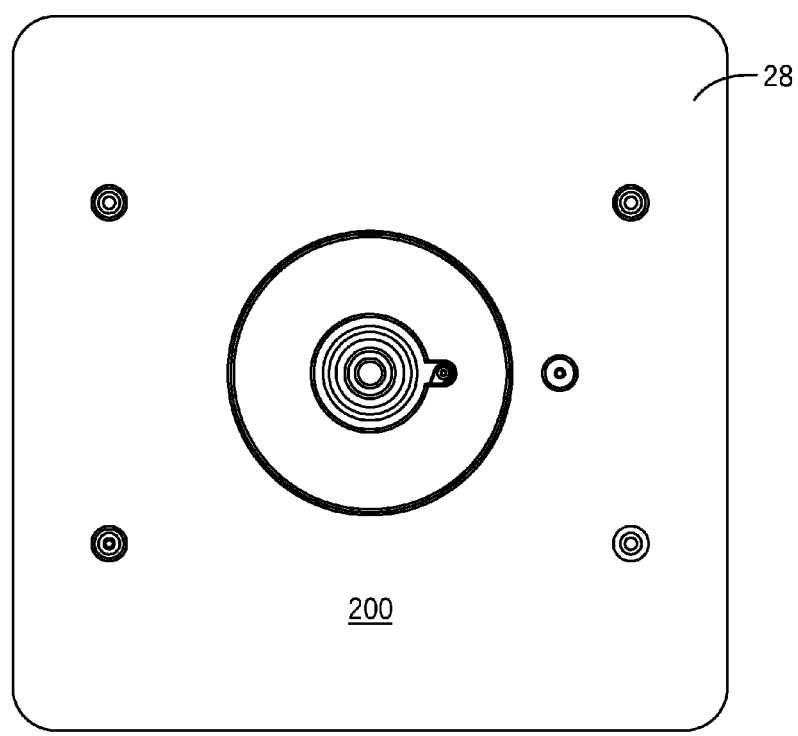
Figure 24:
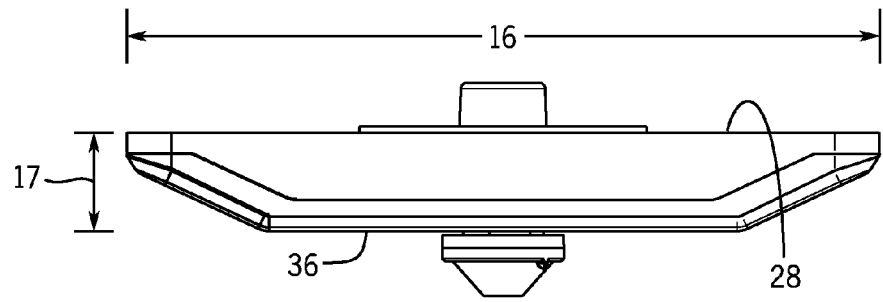
Figure 25:
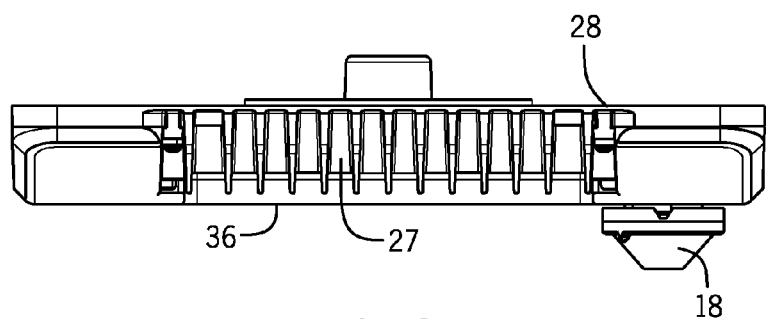
Figure 26:
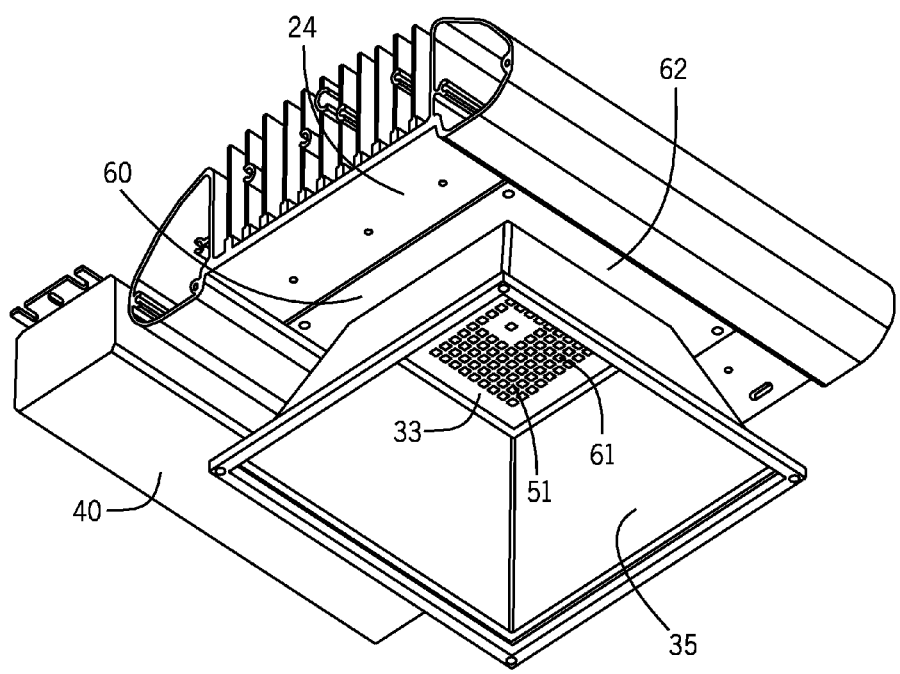
FIG. 26 is a partially-assembled perspective view of a yet another embodiment of an LED light fixture according to this invention.

As seen in FIGS. 3 and 5, light fixture 10 includes a base plate 200 with LED circuit board 60 secured to a front surface 26 thereof and with LED power-circuitry unit 40 secured with respect to front surface 26 in a position adjacent to circuit board 60. FIGS. 1-3 show that heat-dissipating surfaces 27 extend from front surface 26 of base plate 200 with LED circuit board 60 being in position adjacent to heat-dissipating surfaces 27. As seen in FIGS. 23-25, base plate 200 has a substantially planar back surface 28. FIGS. 3, 6 and 15-17 show LED power-circuitry unit 40, LED circuit board 60, and heat-dissipating surfaces positioned entirely in front of base plate 200, with no portion of the light fixture other than electrical connections extending behind back surface 28.

Figure 22:
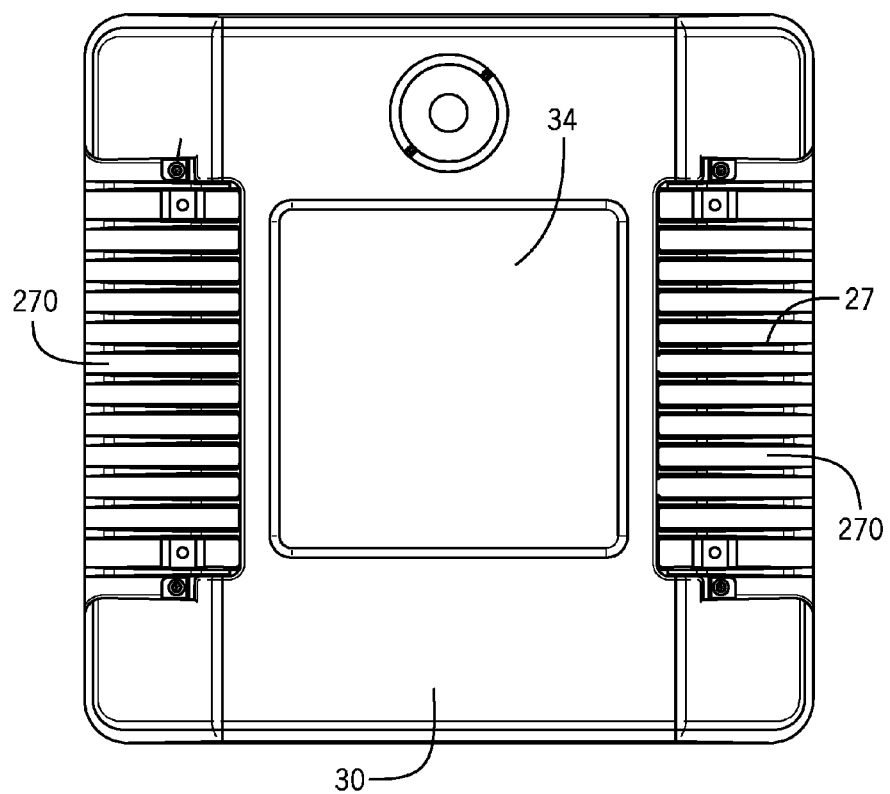
FIGS. 22-25 are a bottom plan view, a top plan view, a front elevation and a side elevation of the LED light fixture of FIG. 1.

Heat-dissipating surfaces 27 extend substantially orthogonally to front surface 26 of base plate 200. As seen in FIGS. 5 and 22, the base plate is rectangular and heat-dissipating surfaces 27 are in two regions 270 positioned beside LED circuit board 60 only on two opposite sides thereof.

As seen in FIGS. 1, 2 and 22, cover 30 extends over LED power-circuitry unit 40 while leaving uncovered heat-dissipating surfaces 27. Cover 30 defines light-emitting opening 34 over LED circuit board 60.

FIG. 5 shows base plate 200 rectangular with heat-dissipating surfaces 27 being in two regions 270 positioned beside LED circuit board 60 only on two opposite lateral sides thereof. Regions 270 of heat-dissipating surfaces 27 are on two of the four lateral sides of base plate 200.

As further seen in FIG. 5, base plate 200 defines a pair of cavities 29 along front surface 26 thereof, one on either side of LED circuit board 60 in positions along the other two opposite lateral sides of base plate 200. LED power-circuitry unit 40 is shown positioned within one of two cavities 29. Light-fixture control circuitry 19 is shown positioned within the other of two cavities 29. Control circuitry 19, sensor 18 and/or communication circuitry may be positioned within cavities 29.

FIG. 1 shows cover 30 extending over control circuitry 19 and light-emitting opening 34 being bounded by portions of cover 30 over LED power-circuitry 40 and control circuitry 19.

As seen in FIGS. 15-21, 24 and 25, the cross-section of fixture 10 orthogonal to base plate 200 is such that the aspect ratio of such cross-section is greater than about 6. As used herein, the term "aspect ratio" means the ratio of a plan-view cross-dimension 16 of the base plate to the cross-dimension 17 of the fixture between back surface 28 of base plate 200 and a forwardmost surface 36 of cover 30. The aspect ratio may be greater than about 7.5.

In the fixtures shown in FIGS. 15 and 16, thickness 17 of the cross-section between back surface 28 of base plate 200 and a forwardmost surface 36 of cover 30 is no more than about 3 inches. In the fixture shown in FIG. 17, such thickness is no more than about 2 inches.

Figure 19:
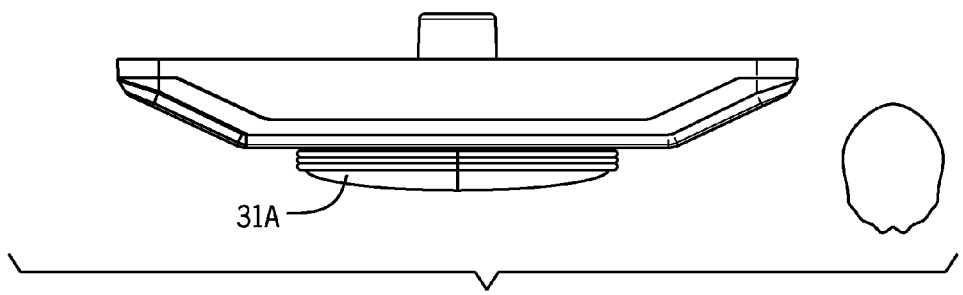
FIGS. 19-21 are side elevations of three alternative embodiments of the present invention.
Figure 20:
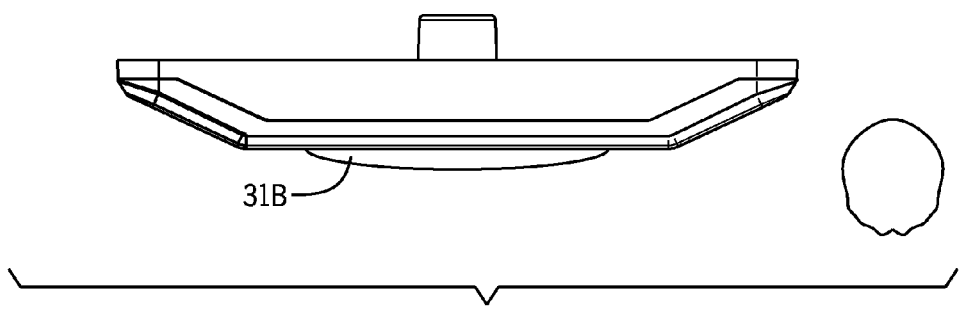
Figure 21:
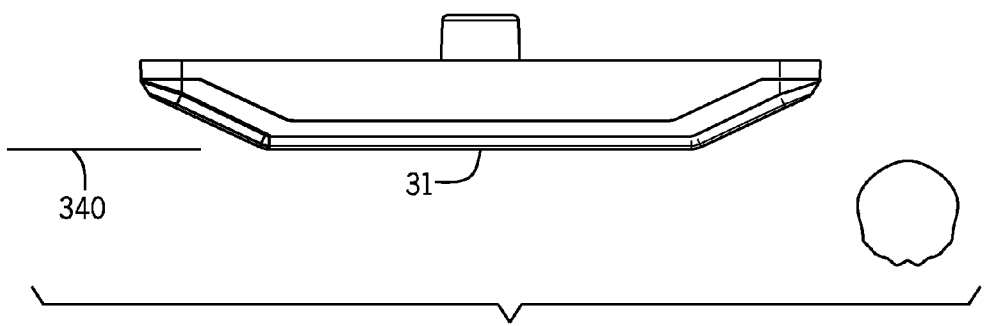

Light-emitting opening 34 in cover 30 defines a plane 340 seen in FIG. 21. FIG. 21 shows lens 31 is substantially planar, in plane 340. FIGS. 19 and 20 show the lens as a drop-out lens 31A and 31B which extends beyond plane 340 of opening 34. This facilitates a portion of the light being directed laterally, which is useful for curb-side appeal.

In FIGS. 15-17, the LED light fixture is shown as a surface-mount LED light fixture for mounting on a surface 1 of a structure such that, when the fixture is installed, back surface 28 of base plate 200 is substantially against structure surface 1.

The low-profile configuration of the light fixture permits installation against the structure with a relatively small aperture formed in structure surface 1 for electrical connections. This is beneficial in installations for outdoor canopies such as those used at gasoline stations. In particular, the small connection aperture minimizes access of water to the fixture. Another benefit provided by the light fixture according to the present invention is that all major components are accessible for servicing from the light-emitting front of the fixture, under the canopy.

Figure 18:
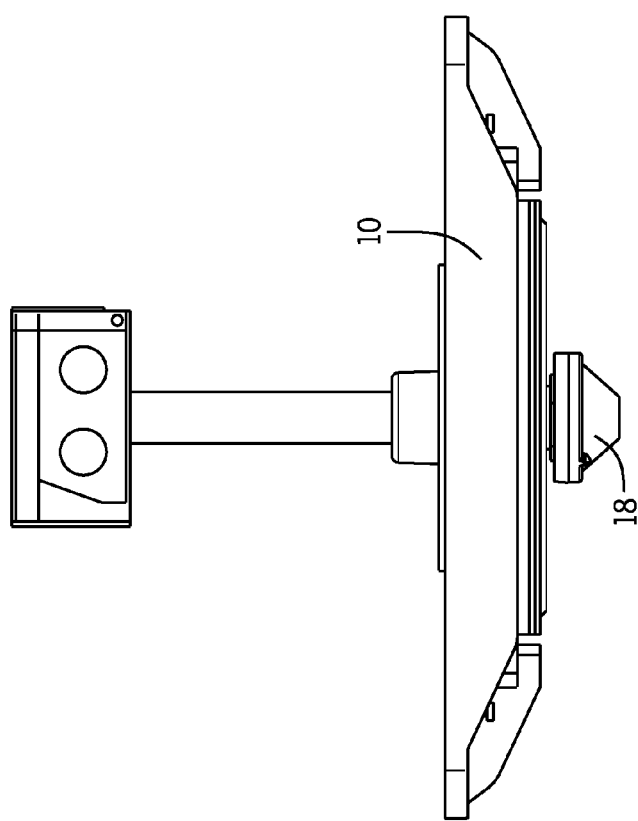
FIG. 18 is a side elevation of a further embodiment of this invention in the form of a pendant light fixture.

In FIG. 18, the LED fixture according to this invention is shown as a pendant light.

FIGS. 1, 18, 24 and 25 also show an example of a sensor 18 at the exterior of enclosure 11 for control of the fixture. Sensor 18 is shown to extend forwardly from forwardmost surface 36 of cover 30. The sensor may have a non-metallic casing of various shapes, including a substantially flat configuration. In some embodiments, control of the fixture may require receipt of a wireless signal. In such embodiments, an antenna for receiving such wireless signal may be disposed within the non-metallic casing of the sensor and outside enclosure 11.

While the principles of the invention have been shown and described in connection with specific embodiments, it is to be understood that such embodiments are by way of example and are not limiting.

The invention claimed is:

1. An LED light fixture comprising:
   a heat-sink body having a circuit-board mounting surface;
   an LED circuit board in thermal-contact relationship to the circuit-board mounting surface, the circuit board having an LED-populated area and a surrounding non-LED-populated area such that lateral heat conduction within the circuit board is greater than heat conduction from the circuit board to the circuit-board mounting surface,
   whereby removal of heat from the LED-populated area is facilitated by lateral conduction of heat therefrom to the non-LED-populated area of the circuit board from which heat is conducted to the heat-sink body.

2. The LED light fixture of claim 1 wherein the heat-sink body forms a base of the fixture and the fixture further includes a cover secured with respect thereto, the cover defining a light-transmissive opening over the LED-populated area.

3. The LED light fixture of claim 2 further comprising a light-transmissive member positioned in the cover opening.

4. The LED light fixture of claim 3 wherein the light-transmissive member comprises a phosphorescent material such that at least some of the light emitted by the fixture has a different wavelength than the light emitted from the LED-populated area.

5. The LED light fixture of claim 2 wherein the cover serves as an aperture member supported over the circuit-board mounting surface and forming an optical aperture, the cover opening being the optical aperture, the non-LED-populated area of the circuitboard extending beyond the optical aperture.

6. The LED light fixture of claim 1 wherein the heat-sink body comprises a front surface and heat-dissipating surfaces extending from the front surface which includes the circuit-board mounting surface with the LED circuit board being positioned adjacent to the heat-dissipating surfaces.

7. The LED light fixture of claim 6 wherein the LED-populated area is substantially rectangular in shape and the reflector is frusto-pyramidal in shape.

8. The LED light fixture of claim 1 wherein at least 50% of the non-LED-populated area of the circuit board extends beyond the optical aperture.

9. The LED light fixture of claim 8 wherein substantially the entirety of the non-LED-populated area extends beyond the optical aperture.

10. The LED light fixture of claim 1 wherein at least 50% of the area of the circuit board extends beyond the optical aperture.

11. The LED light fixture of claim 1 wherein the non-LED-populated area of the circuit board extends beyond the optical aperture by at least about 1.0 inch on every side around the circuit board.

12. The LED light fixture of claim 11 wherein the non-LED-populated area of the circuit board is greater than the LED-populated area.

13. The LED light fixture of claim 1 wherein during operation of the light fixture the circuit board is substantially isothermal.

14. The LED light fixture of claim 1 wherein the spacing between adjacent LED light sources of the LED-populated area is no more than about the cross-dimension of each of the LED light sources.

15. An LED light fixture comprising a heat-sink body having a circuit-board mounting surface, an LED circuit board affixed in thermal-contact relationship to the circuit-board mounting surface and having an LED-populated area and a non-LED-populated area, and an aperture member positioned over the circuit board and forming an optical aperture for transmission of light from the LED-populated area, the non-LED-populated area of the circuit board extending beyond the optical aperture, such that lateral heat conduction within the circuit board is greater than heat conduction from the circuit board to the circuit-board mounting surface of the heat-sink body.

16. The LED light fixture of claim 15 wherein the heat-sink body forms a base of the fixture and the fixture further includes a cover secured with respect thereto, the cover defining an opening over the LED-populated area.

17. The LED light fixture of claim 16 further comprising a light-transmissive member positioned in the cover opening.

18. The LED light fixture of claim 17 wherein the light-transmissive member comprises a phosphorescent material such that at least some of the light emitted by the fixture has a different wavelength than the light emitted from the LED-populated area.

19. The LED light fixture of claim 15 wherein the heat-sink body comprises a front surface and heat-dissipating surfaces extending from the front surface which includes the circuit-board mounting surface with the LED circuit board being positioned adjacent to the heat-dissipating surfaces.

20. The LED light fixture of claim 16 further comprising a reflector extending from a first end adjacent to and surrounding the LED-populated area to a second end substantially aligned with the cover opening.

21. The LED light fixture of claim 20 wherein the LED-populated area is substantially rectangular in shape, and the reflector is frusto-pyramidal in shape.

22. The LED light fixture of claim 15 wherein at least 50% of the area of the circuit board extends beyond the optical aperture.

23. The LED light fixture of claim 15 wherein the non-LED-populated area of the circuit board extends beyond the optical aperture by at least about 1.0 inch on every side around the circuit board.

24. The LED light fixture of claim 15 wherein at least 50% of the area of the circuit board extends beyond the optical aperture.

25. The LED light fixture of claim 15 wherein during operation of the light fixture the circuit board is substantially isothermal.

26. The LED light fixture of claim 15 wherein the spacing between adjacent LED light sources of the LED-populated area is no more than about the cross-dimension of each of the LED light sources.

27. A low-profile LED light fixture comprising:
   a base plate having (a) a substantially planar back surface, (b) a front surface and (c) heat-dissipating surfaces extending from the front surface substantially orthogonally thereto;
   an LED circuit board secured to the front surface of the base plate in thermal communication therewith in position adjacent to the heat-dissipating surfaces; and at least one LED power-circuitry unit secured with respect to the front surface of the base plate in a position adjacent to the circuit board, wherein the at least one LED power-circuitry unit, the LED circuit board and the heat-dissipating surfaces do not extend behind the back surface.

28. The low-profile LED light fixture of claim 27 further comprising a cover movably secured with respect to the base plate, the cover extending over the LED power-circuitry unit(s) while leaving uncovered the heat-dissipating surfaces, the cover defining a light-emitting opening over the LED circuit board.

29. The low-profile LED light fixture of claim 28 further comprising a lens attached to the cover over the light-emitting opening.

30. The low-profile LED light fixture of claim 29 wherein the light-emitting opening defines a plane and the lens is in such plane and is substantially planar.

31. The low-profile LED light fixture of claim 29 wherein the light-emitting opening defines a plane and the lens is a drop-out lens which extends beyond the plane of the opening, whereby a portion of the light is directed laterally.

32. The low-profile LED light fixture of claim 28 wherein:
the base plate is rectangular; and
the heat-dissipating surfaces are in two regions positioned beside the LED circuit board only on two opposite sides thereof.

33. A low-profile LED light fixture comprising:
a base plate having a front surface and heat-dissipating surfaces extending from the front surface;
an LED circuit board secured to the front surface of the base plate in thermal communication therewith in position adjacent to the heat-dissipating surfaces;
at least one LED power-circuitry unit secured with respect to the front surface of the base plate in a position adjacent to the circuit board;
a cover movably secured with respect to the base plate, the cover extending over the LED power-circuitry unit(s) while leaving uncovered the heat-dissipating surfaces, each LED power-circuitry unit being in thermal communication with the cover,
whereby during operation primary heat transfer from the power-circuitry unit(s) is to the cover and primary heat transfer from the LED circuit board is to the base plate.

34. The low-profile LED light fixture of claim 33 wherein the power-circuitry unit is directionally biased toward the cover to facilitate thermal contact between the power-circuitry unit and the cover.

35. The low-profile LED light fixture of claim 28 wherein the cross-section of the fixture orthogonal to the base plate between the back surface of the base plate and a forwardmost surface of the cover is such that the aspect ratio of the cross-section is greater than about 6.

36. The low-profile LED light fixture of claim 35 wherein the aspect ratio is greater than about 7.5.

37. The low-profile LED light fixture of claim 36 wherein the thickness of the cross-section is no more than about 3 inches.

38. The low-profile LED light fixture of claim 37 wherein the thickness of the cross-section is no more than about 2 inches.

39. The low-profile LED light fixture of claim 33 wherein:
the base plate is rectangular; and
the heat-dissipating surfaces are in two regions positioned beside the LED circuit board only on two opposite sides thereof.

40. The low-profile LED light fixture of claim 39 wherein:
the two regions of the heat-dissipating surfaces are on two of the four sides of the base plate;
the base plate defines a pair of cavities along the front surface thereof, one on either side of the LED circuit board in positions along the other two opposite sides of the base plate; and
the LED power-circuitry unit is positioned within one of the two cavities.

41. A low-profile LED light fixture comprising:
a base plate having (a) a substantially planar back surface, (b) a front surface supporting an LED circuit board in thermal communication with the base plate, (c) heat-dissipating surfaces extending from the front surface in two regions beside the LED circuit board, each region being on one of first and second opposite sides of the base plate, and (d) a pair of cavities along third and fourth opposite sides of the front surface on either side of the LED circuit board;
at least one LED power-circuitry unit secured within one of the cavities; and
light-fixture control circuitry within the other of the cavities defined by the base plate.

42. The low-profile LED light fixture of claim 41 further comprising a cover movably secured with respect to the base plate and extending over the control circuitry and LED power-circuitry unit(s) while leaving uncovered the heat-dissipating surfaces, the cover defining a light-emitting opening over the LED circuit board, the light-emitting opening being bounded by portions of the cover over the LED power-circuitry unit(s) and the control circuitry.

43. The low-profile LED light fixture of claim 27 being a surface-mount light fixture with the back surface, when the fixture is installed, being substantially against the structure surface and the at least one LED power-circuitry unit, the LED circuit board and the heat-dissipating surfaces do not extend behind the structure surface.

* * * * *